United States Patent
Whitby-Strevens et al.

(10) Patent No.: US 10,176,141 B2
(45) Date of Patent: Jan. 8, 2019

(54) METHODS AND APPARATUS FOR VIRTUAL CHANNEL ALLOCATION VIA A HIGH SPEED BUS INTERFACE

(71) Applicant: APPLE INC., Cupertino, CA (US)

(72) Inventors: Colin Whitby-Strevens, Cupertino, CA (US); Sreeraman Anantharaman, Cupertino, CA (US)

(73) Assignee: APPLE INC., Cupertino, CA (US)

(*) Notice: Subject to any disclaimer, the term of this patent is extended or adjusted under 35 U.S.C. 154(b) by 0 days.

(21) Appl. No.: 15/894,719

(22) Filed: Feb. 12, 2018

(65) Prior Publication Data

US 2018/0232333 A1 Aug. 16, 2018

Related U.S. Application Data

(62) Division of application No. 14/566,454, filed on Dec. 10, 2014, now Pat. No. 9,892,084.

(Continued)

(51) Int. Cl.
*G06F 13/42* (2006.01)
*G09G 5/00* (2006.01)
(Continued)

(52) U.S. Cl.
CPC ........ *G06F 13/426* (2013.01); *G06F 13/4282* (2013.01); *G09G 5/00* (2013.01);
(Continued)

(58) Field of Classification Search
None
See application file for complete search history.

(56) References Cited

U.S. PATENT DOCUMENTS 5,659,542 A * 8/1997 Bell ................. H04L 29/06
370/496
5,850,395 A 12/1998 Hauser et al.
(Continued)

FOREIGN PATENT DOCUMENTS

| EP | 3013008 A1 | 4/2016 |
| JP | 2013246642 A | 12/2013 |
| WO | WO-2008070138 A2 | 6/2008 |

OTHER PUBLICATIONS

ECN L1 PM Substates with CLKREQ approved Aug. 23, 2012.
(Continued)

*Primary Examiner* — Michael Sun
(74) *Attorney, Agent, or Firm* — Gazdzinski & Associates, PC

(57) ABSTRACT

Methods and apparatus for virtual channel allocation within an electronic device. In one exemplary embodiment, the device is a consumer electronics device having multiple camera sensors uses a modified high-speed protocol (e.g., DisplayPort Multi-Stream Transport (MST) protocol) to process camera data via one or more virtual channels. Unlike traditional solutions which rely on an intelligent source device to manage a network of devices, the present disclosure describes in one aspect a network of nodes internal to a consumer electronic device that is managed by the sink node (i.e., a "smart sink"). Additionally, since the full suite of protocol (e.g., DisplayPort) capabilities are unnecessary for certain design scenarios, certain further disclosed simplifications improve performance for sink nodes having very modest capabilities.

20 Claims, 10 Drawing Sheets

Related U.S. Application Data

(60) Provisional application No. 61/914,322, filed on Dec. 10, 2013.

(51) Int. Cl.
*H04N 21/4223* (2011.01)
*H04N 21/426* (2011.01)
*H04N 5/232* (2006.01)

(52) U.S. Cl.
CPC ........... *G09G 5/006* (2013.01); *H04N 21/426* (2013.01); *H04N 21/4223* (2013.01); *G09G 2340/0435* (2013.01); *G09G 2352/00* (2013.01); *G09G 2370/08* (2013.01); *G09G 2370/10* (2013.01); *G09G 2370/20* (2013.01); *G09G 2370/22* (2013.01); *H04N 5/23203* (2013.01)

(56) References Cited

U.S. PATENT DOCUMENTS

| | | |
|---|---|---|
| 5,943,507 A | 8/1999 | Cornish et al. |
| 6,359,863 B1 | 3/2002 | Varma et al. |
| 6,553,446 B1 | 4/2003 | Miller |
| 6,693,895 B1 | 2/2004 | Crummey et al. |
| 6,948,094 B2 | 9/2005 | Schultz et al. |
| 7,100,020 B1 | 8/2006 | Brightman et al. |
| 7,397,774 B1 * | 7/2008 | Holland ................ H04J 3/1682 370/326 |
| 7,853,731 B1 | 12/2010 | Zeng |
| 7,899,941 B2 | 3/2011 | Hendry et al. |
| 7,941,682 B2 | 5/2011 | Adams |
| 8,255,725 B2 | 8/2012 | Shimazaki et al. |
| 8,352,624 B2 | 1/2013 | Zimmerman et al. |
| 8,468,285 B2 | 6/2013 | Kobayashi |
| 8,656,228 B2 | 2/2014 | Check et al. |
| 8,788,822 B1 | 7/2014 | Riddle |
| 8,799,537 B1 * | 8/2014 | Zhu ...................... G06F 13/385 710/14 |
| 8,848,809 B2 | 9/2014 | Whitby-Strevens |
| 9,164,930 B2 | 10/2015 | Zeng et al. |
| 9,319,090 B2 | 4/2016 | Whitby-Strevens |
| 9,544,069 B2 | 1/2017 | Whitby-Strevens et al. |
| 2002/0044553 A1 | 4/2002 | Chakravorty |
| 2002/0169938 A1 | 11/2002 | Scott et al. |
| 2004/0201749 A1 * | 10/2004 | Malloy Desormeaux ................... H04N 1/00132 348/231.99 |
| 2004/0221056 A1 | 11/2004 | Kobayashi |
| 2004/0228365 A1 | 11/2004 | Kobayashi |
| 2005/0117601 A1 | 6/2005 | Anderson et al. |
| 2005/0157781 A1 | 7/2005 | Ho et al. |
| 2005/0285862 A1 | 12/2005 | Noda et al. |
| 2007/0070997 A1 | 3/2007 | Weitz et al. |
| 2007/0201492 A1 | 8/2007 | Kobayashi |
| 2007/0286246 A1 | 12/2007 | Kobayashi |
| 2008/0231711 A1 | 9/2008 | Glen et al. |
| 2008/0235355 A1 | 9/2008 | Spanier et al. |
| 2008/0301148 A1 | 12/2008 | Lee et al. |
| 2009/0010533 A1 | 1/2009 | Hung |
| 2009/0024924 A1 | 1/2009 | Kim |
| 2009/0189442 A1 | 7/2009 | Chi |
| 2010/0017655 A1 | 1/2010 | Gooding et al. |
| 2010/0037283 A1 | 2/2010 | Zhu |
| 2010/0082859 A1 | 4/2010 | Hendry et al. |
| 2010/0098419 A1 | 4/2010 | Levy et al. |
| 2010/0329319 A1 | 12/2010 | Dai et al. |
| 2011/0052142 A1 | 3/2011 | Sultenfuss et al. |
| 2011/0087854 A1 * | 4/2011 | Rushworth ........... G06F 12/023 711/170 |
| 2011/0219208 A1 | 9/2011 | Asaad et al. |
| 2011/0242425 A1 | 10/2011 | Zeng |
| 2011/0276710 A1 | 11/2011 | Mighani et al. |
| 2011/0310296 A1 | 12/2011 | Lee et al. |
| 2011/0320861 A1 | 12/2011 | Bayer et al. |
| 2012/0127367 A1 | 5/2012 | Glen |
| 2012/0224640 A1 | 9/2012 | Sole et al. |
| 2012/0229076 A1 | 9/2012 | Zhu et al. |
| 2013/0003639 A1 * | 1/2013 | Noh ....................... H04L 5/0053 370/312 |
| 2013/0050216 A1 | 2/2013 | Whitby-Strevens et al. |
| 2013/0057567 A1 | 3/2013 | Frank et al. |
| 2013/0162911 A1 | 6/2013 | Glen |
| 2013/0235941 A1 | 9/2013 | Koo et al. |
| 2013/0311669 A1 * | 11/2013 | Reimers ................. H04H 20/42 709/231 |
| 2014/0247983 A1 | 9/2014 | MacInnis et al. |
| 2015/0036051 A1 | 2/2015 | Broberg et al. |
| 2015/0092646 A1 * | 4/2015 | Tabet ................ H04W 28/0221 370/311 |
| 2015/0117601 A1 * | 4/2015 | Keeve .................... A61B 6/589 378/41 |
| 2015/0189109 A1 | 7/2015 | Whitby-Strevens et al. |
| 2015/0205749 A1 | 7/2015 | Whitby-Strevens et al. |
| 2015/0378737 A1 | 12/2015 | Debbage et al. |
| 2016/0077989 A1 | 3/2016 | Pulyala et al. |
| 2016/0103480 A1 | 4/2016 | Sanghi et al. |
| 2016/0103689 A1 | 4/2016 | Sanghi et al. |
| 2016/0103743 A1 | 4/2016 | Sanghi et al. |
| 2016/0224442 A1 | 8/2016 | Sanghi et al. |
| 2016/0364350 A1 | 12/2016 | Sanghi et al. |
| 2018/0129261 A1 | 5/2018 | Garg et al. |
| 2018/0129269 A1 | 5/2018 | Garg et al. |
| 2018/0129270 A1 | 5/2018 | Garg et al. |

OTHER PUBLICATIONS

PCI Express base Specification Revision 3.0, published Nov. 10, 2010.
PCI Express Base Specification Revision 3.1, published Oct. 8, 2014.
Universal Serial Bus, Communication Class, Subclass Specifications for Network Control Model (NCM) Devices; Revision 1.0 (Errata 1), Nov. 24, 2010, published by USB Implementers Forum, Inc.

* cited by examiner

METHODS AND APPARATUS FOR VIRTUAL CHANNEL ALLOCATION VIA A HIGH SPEED BUS INTERFACE

PRIORITY AND RELATED APPLICATIONS

This application is a divisional of and claims the benefit of priority to commonly owned U.S. patent application Ser. No. 14/566,454 entitled "METHODS AND APPARATUS FOR VIRTUAL CHANNEL ALLOCATION VIA A HIGH SPEED BUS INTERFACE" filed Dec. 10, 2014, now U.S. Pat. No. 9,892,084, which claims the benefit of priority to U.S. Provisional Patent Application Ser. No. 61/914,322 filed Dec. 10, 2013 entitled "METHODS AND APPARATUS FOR VIRTUAL CHANNEL ALLOCATION VIA A HIGH SPEED BUS INTERFACE", each of the foregoing being incorporated herein by reference in its entirety.

This application is related to commonly owned, and co-pending U.S. patent application Ser. No. 14/566,554 entitled "APPARATUS AND METHODS FOR PACKING AND TRANSPORTING RAW DATA", filed Dec. 10, 2014, which claims the benefit of priority to commonly owned U.S. Provisional Patent Application Ser. No. 61/914,312 entitled "APPARATUS AND METHODS FOR PACKING AND TRANSPORTING RAW DATA", filed Dec. 10, 2013, each of which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technical Field

The disclosure relates generally to the field of audio/visual (A/V) consumer electronics devices, as well as networks thereof. More particularly, in one exemplary aspect, the disclosure is directed to methods and apparatus adapted to virtual channel allocation on an A/V interface.

2. Description of Related Technology

DisplayPort® is an exemplary and emerging digital display interface technology specified by the Video Electronics Standards Association (VESA). Current incarnations of the standard specify support for simple networking of digital audio/visual (A/V) interconnects, intended to be used primarily between an arbitrary assembly of multimedia "sources" (e.g., computers or CPUs) and "sinks" (e.g. display monitors, home-theater system, etc.). This interconnection is generally unidirectional in nature; i.e., from source to sink, in current implementations.

For reasons described in greater detail hereinafter, incipient research is directed to leveraging portions of DisplayPort technology for internal consumer electronics device operations (e.g., bus interfaces, etc.). Various implementation specific considerations require substantial modifications to the underlying DisplayPort control scheme. For example, certain internal components (e.g., camera modules) lack sufficient processing capabilities to comply with DisplayPort bus protocols including, but not limited to, virtual channel allocation. Other aspects of the DisplayPort protocol may be "over-designed", or provide capabilities which are unnecessary.

Accordingly, improved methods and apparatus are needed to support internal consumer electronics device operations using DisplayPort technology (such as virtual channel allocation). More generally, apparatus and methods are needed for networking internal components of a consumer electronics device.

SUMMARY

The present disclosure satisfies the foregoing needs by providing, inter alia, methods and apparatus for networking, including virtual channel allocation on an A/V interface.

Firstly, a method for virtual channel allocation within a (consumer) electronic device is disclosed. In one embodiment, the method includes: discovering one or more sensors (e.g., camera sensors) of a network of sensors; transmitting a communication (e.g., an update request) to a first sensor of the network, the update request configured to responsively cause the first sensor to determine an amount of resources and a mapping of one or more data to resources; and transmitting a signal (e.g., an allocation change trigger) configured to cause the first sensor to map the one or more data to resources according to the mapping.

Secondly, a method for virtual channel allocation within a device (e.g., a consumer electronic device) is disclosed. In one embodiment, the method includes: discovering one or more nodes; transmitting an update request to a node; the update request configured to responsively cause the node to determine an amount of resources and a mapping of one or more data to resources; and transmitting an allocation change trigger, the allocation change trigger configured to cause the node to map the one or more data to resources according to the mapping.

An apparatus configured to allocate one or more virtual channel allocations within an electronic device is also disclosed.

An apparatus configured to map one or more data to one or more virtual channel allocations within an electronic device is further disclosed.

A non-transitory computer readable apparatus is also disclosed. In one embodiment, the apparatus includes a medium comprising instructions configured to, when executed by a processor, cause processor device to allocate one or more virtual channel allocations within an electronic device.

A system for allocating one or more virtual channel allocations within an electronic device is additionally disclosed.

In one aspect of the present disclosure, a content capture system is disclosed. In one embodiment, the content capture system includes: a camera device, the camera device configured to generate one or more DisplayPort multi-stream transport (MTP) channel packets; a System on a Chip (SoC), the SoC configured to receive the one or more DisplayPort MTP channel packets, and in communication with the camera device via an auxiliary channel and a MTP channel. In one such variant, the SoC is configured to: power on the camera device via the auxiliary channel; instruct the camera device to update a payload allocation table of the camera device via the auxiliary channel; poll the camera device to determine whether the payload allocation table has been updated; when it is determined that the payload allocation table has been updated, instruct the camera device, via the auxiliary channel, to send an allocation change trigger via the MTP channel; and upon receipt of the allocation change trigger from the camera device, instruct the camera device to initiate video transmission. In one variant, the camera device is configured to: calculate a payload bandwidth number based on the instruction to update the payload allocation table; set a virtual channel payload bandwidth of the MTP channel by allocating sufficient time slots on the MTP channel to a content payload; receive an instruction, via the auxiliary channel, to send the allocation change trigger via the MTP channel; send the allocation change trigger to the SoC via the MTP channel; and upon receipt of the instruction to initiate video transmission, initiate video transmission via the MTP channel.

In one variant, the auxiliary channel comprises an inter-integrated circuit (I2C) bus.

In another variant, the MTP channel comprises a communication protocol using 1024 MIT channel packets, each MPT channel packet of the MTP channel packets comprising 64 time division multiplexed timeslots. In one such case, a plurality of MPT channel packets of the MPT channel packets comprise an MPT header at a first of the 64 time division multiplexed timeslots; and the allocation change trigger is sent via the MPT channel in the MPT header of a second plurality of MPT channel packets of the plurality of MPT channel packets.

In one implementation, the SoC is further configured to issue a command to synchronize a payload time slot allocation among the camera device and a plurality of other devices configured to generate corresponding DisplayPort MTP channel packets, via the auxiliary channel. In some cases, the command to synchronize the payload time slot allocation comprises a PAYLOAD_ALLOCATE_SET command.

In another exemplary variant, the system includes a concentrator, the concentrator being an intermediary between the camera device and the SoC; and wherein the SoC is further configured to instruct the concentrator to update a second payload allocation table when the payload allocation table has been updated. In one exemplary case, the system includes a second camera, the second camera in communication with the SoC via the concentrator. In one such case, the concentrator is configured to, upon receipt of the allocation change trigger from the camera device, raise an interrupt to the SoC to signal receipt thereof.

In another example, a payload bandwidth manager of the concentrator is configured to direct allocation of upstream packets from the camera device to the SoC to assist the establishment of a virtual channel comprising transport of a plurality packets each of which comprises a plurality of time slots over the multi-stream transport channel. Still other examples further configure the concentrator to pass along a stream symbol sequence generated by the camera device via a virtual channel packet time slot; and generate a fill symbol sequence to fill in another virtual channel packet time slot not allocated to the stream symbol sequence.

In some variants, the SoC is configured to control all communications between the SoC and the camera device.

A method for virtual channel allocation within a network of nodes comprising one or more source nodes and a sink node within an electronic device is disclosed. In one embodiment, the method includes: discovering the one or more source nodes of the network by the sink node; transmitting, by the sink node, a communication to a first node of the one or more source nodes; and causing the first node to configure resources according to the communication.

In one variant, the communication is an update request configured to responsively cause the first node to determine an amount of resources and a mapping of one or more data to resources.

In another variant, the configuration of resources by the first node comprises writing to a table configured to identify a group of timeslots within a virtual channel that are allocated for a data stream.

In other variations, the method further includes receiving by the sink node, data according to the new configuration transmitted by the first node. In some such variants, the transmitting of data occurs after receipt of a trigger from the sink node after verification of the configuration by the first node.

A computer-readable storage apparatus is disclosed. In one embodiment, the computer-readable storage apparatus includes a non-transitory storage medium having at least one computer program stored thereon, the at least one program being configured to, when executed, cause a processor to: power on a sensor device via an auxiliary channel; instruct the sensor device to update a payload allocation table of the sensor device via the auxiliary channel; poll the sensor device to determine whether the payload allocation table has been updated; when the payload allocation table has been updated, instruct the sensor device, via the auxiliary channel, to send an allocation change trigger via a transport channel; and upon receipt of the allocation change trigger from the sensor device, instruct the sensor device to initiate data transmission.

In some variants, the at least one computer program is configured to, when executed, receive data transmission from the sensor device.

In some variants, the sensor device comprises a camera sensor with limited processing capability.

Other features and advantages of the present disclosure will immediately be recognized by persons of ordinary skill in the art with reference to the attached drawings and detailed description of exemplary embodiments as given below.

Figure 1:
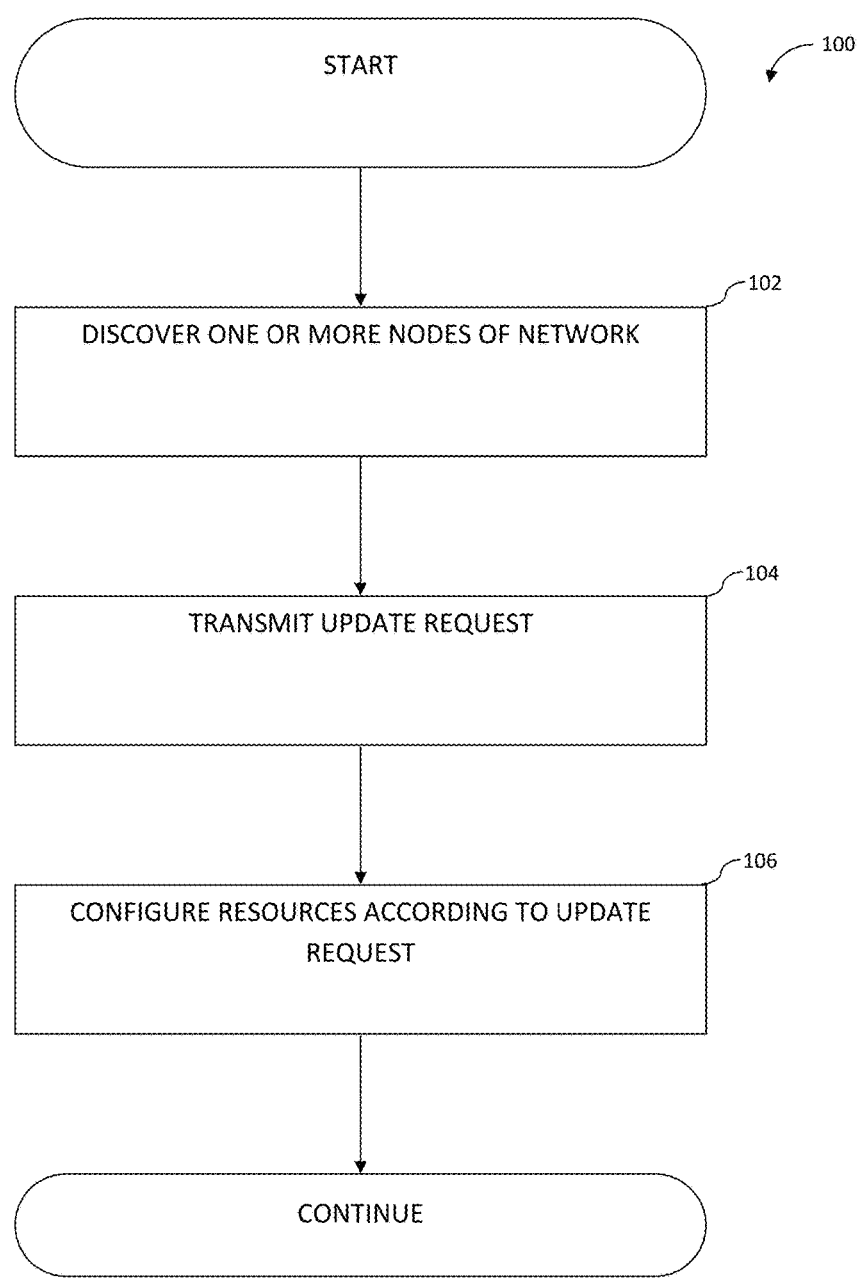
FIG. 1 is a logical flow diagram of one embodiment of a generalized method for virtual channel allocation according to the disclosure.

All Figures © Copyright 2013-2014 Apple Inc. All rights reserved.

DETAILED DESCRIPTION

Reference is now made to the drawings, wherein like numerals refer to like parts throughout.

As used herein, the term "DisplayPort" refers without limitation to apparatus and technology compliant with "VESA DisplayPort Standard"—Version 1, Revision 1a dated Jan. 11, 2008; "VESA DisplayPort Panel Connector Standard"—Version 1.1 dated Jan. 4, 2008; "VESA DisplayPort™ PHY Compliance Test Standard"—Version 1 dated Sep. 14, 2007; and/or "VESA DisplayPort™ Link Layer Compliance Test Standard"—Version 1.0, dated Sep. 14, 2007, as well as so-called "Mini DisplayPort" technology described in the Draft VESA DisplayPort Version 1.2 Standard, each of the foregoing being incorporated herein by reference in its entirety, and any subsequent revisions thereof.

Overview

Apparatus and methods for networking internal components of a consumer electronics device are disclosed herein. In one exemplary embodiment, a consumer electronics device having multiple camera sensors uses a modified DisplayPort Multi-Stream Transport (MST) protocol to process camera data via one or more virtual channels. Specifically, unlike traditional DisplayPort which could flexibly manage a dynamically changing network of A/V devices, the present disclosure is directed to a system on chip (SoC) processor which manages the (typically fixed) camera sensors. Moreover, since camera sensors do not have significant processing capability, the disclosed embodiments couple the camera sensors to a simplified source node as a camera assembly. The camera assembly is configured to pack camera sensor data in timeslots (virtual channels) according to a table. The camera assembly does not require logic for typical DisplayPort capabilities (e.g., network discovery, etc.).

More generally, while existing A/V networks have used an intelligent source device to manage a network of devices (i.e., the "smart source" paradigm), the present disclosure describes a network of simplified nodes internal to a consumer electronic device that is managed by the sink node (i.e., "smart sink"). The sink node is an applications processor which runs the device operating system, applications, etc. Various embodiments of the present disclosure are adapted to dynamically adjust bandwidth when instructed by the sink node.

Various other refinements and simplifications include reduced network management (e.g., discovery, pre-programmed configurations, etc.), flow control, timeouts, etc. These simplifications enable network management for processors with very modest capabilities. Yet other optimizations disclosed herein will be readily appreciated by those of ordinary skill in the related arts, given the contents of the present disclosure.

Detailed Description of Exemplary Embodiments

Exemplary embodiments of the present disclosure are now described in detail. While these embodiments are primarily discussed in the context of modifications to DisplayPort to support virtual channel allocation with internal components (e.g., a camera sensor), it will be recognized by those of ordinary skill that the present disclosure is not so limited. In fact, the various aspects of the disclosure are useful in any network technology that is configured to incorporate network elements which are limited in processing power, functionality, etc. as is disclosed herein.

Exemplary Embodiment—DisplayPort Technology

Extant DisplayPort technology is an extensible digital interface solution that is designed for a wide variety of performance requirements, and broadly supports PCs, monitors, panels, projectors, and high definition (HD) content applications. DisplayPort technology is capable of supporting both internal chip-to-chip, and external box-to-box digital display connections. Examples of internal chip-to-chip applications include notebook PCs which drive a display panel from a graphics controller, or display components from display controllers driving the monitor of a TV. Examples of box-to-box applications include display connections between PCs and monitors, and projectors (e.g., not housed within the same physical device).

The camera component inside most consumer electronics devices (e.g., iOS devices such as the iPad and iPhone devices manufactured by the Assignee hereof) is a simple image sensor and/or controller that does not have significant indigenous processing capabilities. Traditionally, camera data was streamed via a Mobile Industry Processor Interface (MIPI) to the application processor. Incipient research is directed to adapting DisplayPort technology for use with internal components (such as the aforementioned camera sensors that lack processing capability). DisplayPort technologies offer, inter alia, much higher bandwidths and other desirable features (e.g., multi-stream capability, etc.).

As a brief aside, DisplayPort provides unidirectional transmission of audio and video data from source nodes (where the content is generated from) to sink nodes (which consumes content), and an auxiliary channel (back-channel) for capability and status information to be sent from the sink to the source. Unlike typical bi-directional bus and network technologies, unidirectional device technologies (e.g. audio-visual systems such as DisplayPort, HDMI, DVI, etc.) have resisted bus or network arbitration, as the overhead imposed by such networking layers provides minimal benefit for direct source-to-sink type connections. The primary and auxiliary channels operate in "master/slave" mode under control of the master node. The master node controls both the low-level transmission of data between source and sink, and the higher level management of the display and networking.

Unfortunately, the exemplary DisplayPort technologies were designed for a "smart source" paradigm; i.e., the device providing the data performs bus management. In view of the capabilities of camera components (and other similarly limited components), DisplayPort and other "smart source" technologies must be adapted for use in a "smart sink" paradigm. Specifically, in smart sink applications, the slave source (e.g., a camera sensor) generates data/content for the master sink (e.g., the application processor).

Additionally, the full suite of DisplayPort capabilities may be unnecessary; other simplifications may further improve performance on controllers having very modest capabilities.

Methods

FIG. 1 is a logical flow diagram of one embodiment of a generalized method 100 for virtual channel allocation.

At step 102 of the method 100, a sink node discovers one or more nodes of the sink node's network. As used herein, the term "node" refers without limitation to a logical endpoint and/or logical point of connection within a network (e.g., a network of interconnected nodes). As will be appreciated by those of ordinary skill given the contents of the present disclosure, the nodes may be arranged in a variety of different network topologies e.g., tree, bar, ring, star, daisy chain, etc.

Common examples of nodes include sensors (e.g., cameras, microphones, displays, speakers, etc.) which are coupled to a network transceiver (e.g., a simplified DisplayPort transceiver, etc.). Often, nodes are highly optimized components implemented within a single piece of silicon; however, it is appreciated that discrete versions (e.g., composed of multiple chips) may be used with equivalent success consistent with the present disclosure. While the following discussion is presented primarily with reference to a network of nodes within a single consumer electronics device, it is appreciated that implementations vary widely, and may include external sensor assemblies, etc., as well as non-consumer electronic devices As used herein, the term "sink" refers without limitation to a node which consumes data/content, and the term "source" refers without limitation to a node which generates data/content. In one exemplary embodiment, the data or content is a stream of audio/visual data. The stream of audio/visual data may additionally be packetized. In other embodiments, the content is contiguous data. Common examples of content include, without limitation, picture data, video data, audio data, metadata (e.g., gyroscopic data, time stamps, etc.). Those of ordinary skill in the related arts will further appreciate that while the following descriptions are described in terms of temporal streams, the payload data may be generated e.g., asynchronously (no relation between the amount of data and time), synchronously (i.e., a fixed amount of data at a fixed time interval), isochronously (i.e., a guaranteed amount of data transferred no later than a specified time), etc.

One exemplary data format is described in commonly owned, and co-pending U.S. patent application Ser. No. 14/566,554, entitled "APPARATUS AND METHODS FOR PACKING AND TRANSPORTING RAW DATA", filed Dec. 10, 2014, incorporated herein by reference in its entirety. As described therein, a DisplayPort Multi-stream Transport Packet (MTP) is described which packs RAW format camera data.

As used herein, the term "concentrator" refers without limitation to a node which aggregates multiple streams of content. In one embodiment, a concentrator may also be a source or a sink. Moreover, a given node or component may operate as both a source and a sink when appropriately configured (e.g., a source for one device, and a sink for another).

In some embodiments, the sink node performs network discovery when the device is first powered on. In other embodiments, the sink node performs network discovery when a network change is detected; e.g., when a node is added, removed, etc. In some cases, network changes can occur based on use case, or application software requirements. For example, a smartphone with multiple camera components may enable or disable components as necessary to e.g., save power, free up network resources (e.g., timeslots). When the user opens up the camera application (e.g., front facing camera) or switches between cameras (e.g., between a front facing camera and a back facing camera), the sink enables the appropriate camera components (and disables the unused components).

In one embodiment, network discovery may be based on a programmed or hardcoded configuration (as may be useful for fixed designs). In other embodiments, the sink node may perform network discovery via e.g., an out-of-band process, hot plug detect, network protocols (e.g., via I2C bus, DisplayPort AUX channel, etc.), etc. Yet other approaches will be recognized by those of ordinary skill given the present disclosure.

At step 104 of the method 100, the sink node transmits a communication (e.g., an update request) to a first node of the network; responsively, an amount of resources necessary to support the first node's data stream and the data streams of any additionally connected nodes is determined. In one embodiment, the update request is triggered by the sink node responsive to e.g., power up, application requirements, as a result of bandwidth changes of other nodes, etc., or combinations of the foregoing. In other embodiments, the first node may request adjustment (e.g., via I2C bus, DisplayPort AUX channel, etc.), causing the sink node to transmit the update request.

As used herein, the term "resources" refers without limitation to any network asset which has limitations on use. Common examples of resources include e.g., timeslots, physical channels, virtual channels, lanes, frequency bands, scrambling codes, encryption, memory, processing cycles, bus access, etc. For example, within the context of DisplayPort Multi-Stream Transport (MST) operation, a Multi-stream Transport Packet (MTP) frame consists of 1024 MTP packets (numbered 0 . . . 1023). Each MTP packet has sixty four (64) time division multiplexed (TDM) timeslots (numbered 0 . . . 63). Timeslot 0 is reserved for a MTP header (or Scrambler Reset (SR) symbol). The transmitter replaces the MTP header of MTP packet 0 with a SR symbol that denotes a Link Frame Boundary. The remaining timeslots (numbered 1 . . . 63) are network resources that can be used to transact data.

A variety of schemes are contemplated for determining an amount of resources by the first node. In one embodiment, the first node may determine the amount of resources as a fixed number (e.g., where the first node has a single capability).

In other embodiments, the first node may determine the amount of resources based on current (or anticipated) application requirements. For example, a camera module may have a first mode for taking higher definition pictures, and a second mode for taking lower resolution video.

In other examples, a camera module may enable or disable certain types of metadata e.g., time date information, gyroscopic information, compass information, location information, etc. In some cases, only a subset of capabilities of the camera module may be enabled by the manufacturer for various reasons (e.g., the remaining capabilities to be enabled post-deployment according to e.g., certain business models, regulatory requirements, etc.). In some cases, the camera may be anticipatorily enabled when the user opens a particular software application, or performs another action likely to result in camera use (e.g., changes a physical configuration or parameter of the device so as to enable sensor use).

In some cases, the first node may receive data from other nodes (e.g., using "daisy chain" and/or cascaded configurations); accordingly, the first node may incorporate the other data in its own resource determination. For example, a camera module that operates as a concentrator node may receive one or more DisplayPort streams from its upstream port(s), as well as its own camera data; thus, it must determine the number of timeslots which are sufficient for its aggregated bandwidth requirements.

Moreover, it is further appreciated that network resources are finite. Thus, in some configurations, a concentrator node may be required to reduce its own data requirements to sustain its upstream nodes.

While the foregoing examples are presented with the first node determining the resources, it is appreciated that in other embodiments, the determination may be made by other nodes. For example in one implementation, the determination may be made by the sink node (or other master entity). In other implementations, the determination may be made by an upstream or downstream node.

At step 106 of the method 100, the first node configures its resources according to the determined amount. In one embodiment, configuration includes writing a data structure at the first node; the data structure is in one implementation configured to identify the mapping of data to corresponding resources. For example, in one exemplary case, the node writes to a table or other data structure that identifies the group of timeslots (virtual channel) that are allocated for a data stream. In some cases, configuration includes writing a corresponding data structure at another node. For example, in one exemplary case, the node writes to a corresponding data structure of a downstream node or to a network management entity (e.g., the sink node). Common examples of data structures include, without limitation: tables, arrays, hash tables, lists, objects, tuples, etc.

Configuration of a source with a fixed number of valid configurations may be as simple as selecting one of the configurations, and identifying an appropriate block of timeslots. In other example implementations, a very flexible/capable component may require explicit configuration of e.g., buffer depths, setting switches, setting multiplexers, configuring clocks, etc.

In some embodiments, the first node transmits data according to the new configuration immediately. In other embodiments, the configuration does not take place until a subsequent "trigger" event. For example, in one implementation, the first node will verify the change to the sink node. Responsively, the sink node will program a downstream node (e.g., via steps 102-106 of the method 100), and when both the first node and its downstream node are properly configured, the sink node transmits an allocation change trigger causing both nodes to responsively change in lockstep. Yet other options will be recognized by those of ordinary skill given the present disclosure.

Example Operation

Figure 2:
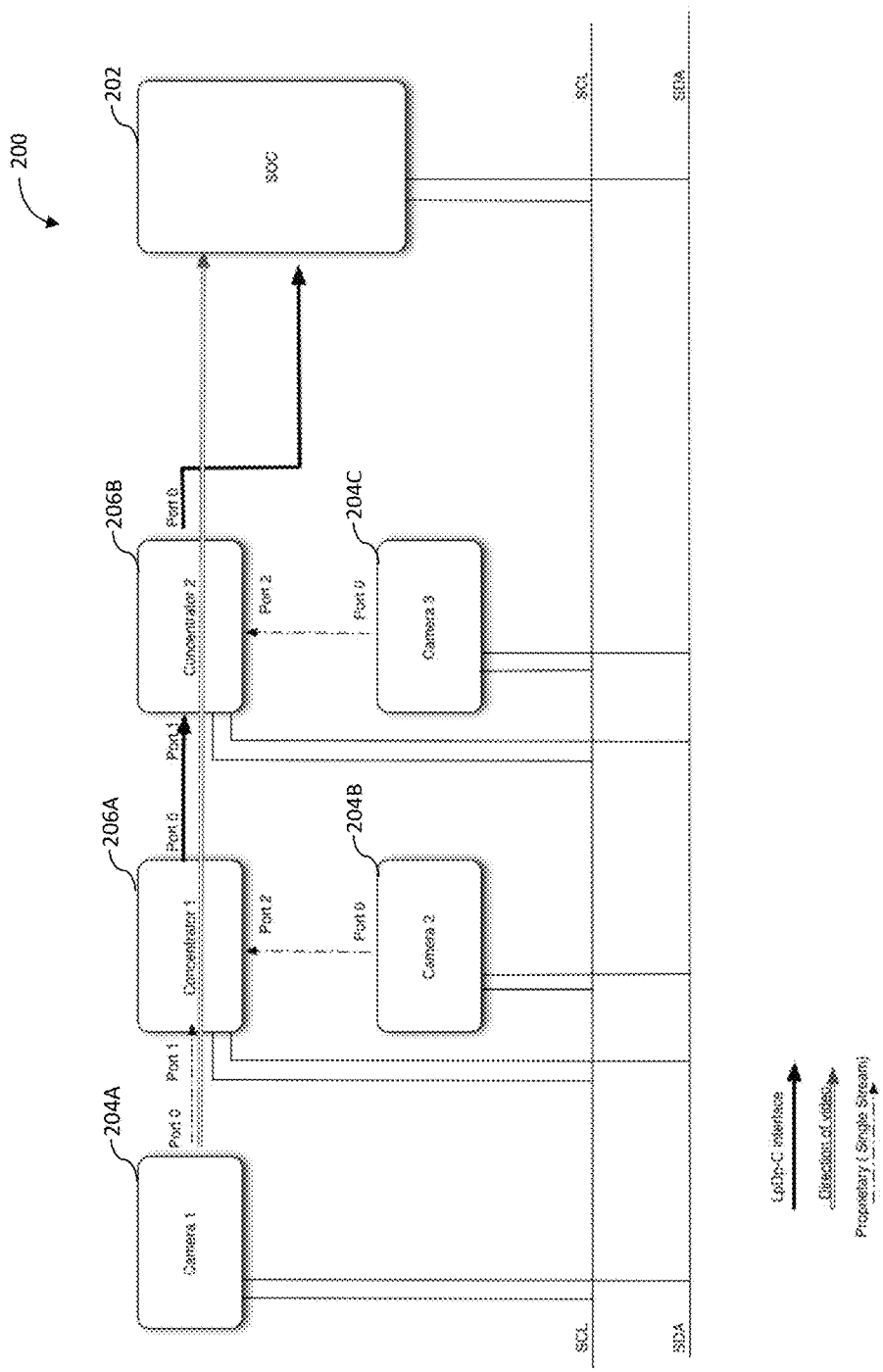
FIG. 2 is a logical block diagram of one exemplary network useful for illustrating virtual channel allocation on an A/V interface utilizing a high speed bus interface.

FIG. 2 is a logical block diagram of one exemplary embodiment of a network 200, useful for illustrating virtual channel allocation on an A/V interface utilizing a high speed bus interface. As shown, the exemplary network includes a system-on-chip (SoC) processor 202 that is connected to a plurality of camera sensors (204A, 204B, 204C) and concentrators (206A, 206B). The SoC processor 202 in this scenario is a sink node which manages the virtual channel allocations for the plurality of sensors (204A, 204B, 204C) and concentrators (206A, 206B), via an I2C control bus (Slave Control (SCL), Slave Data (SDA)).

Figure 3A:
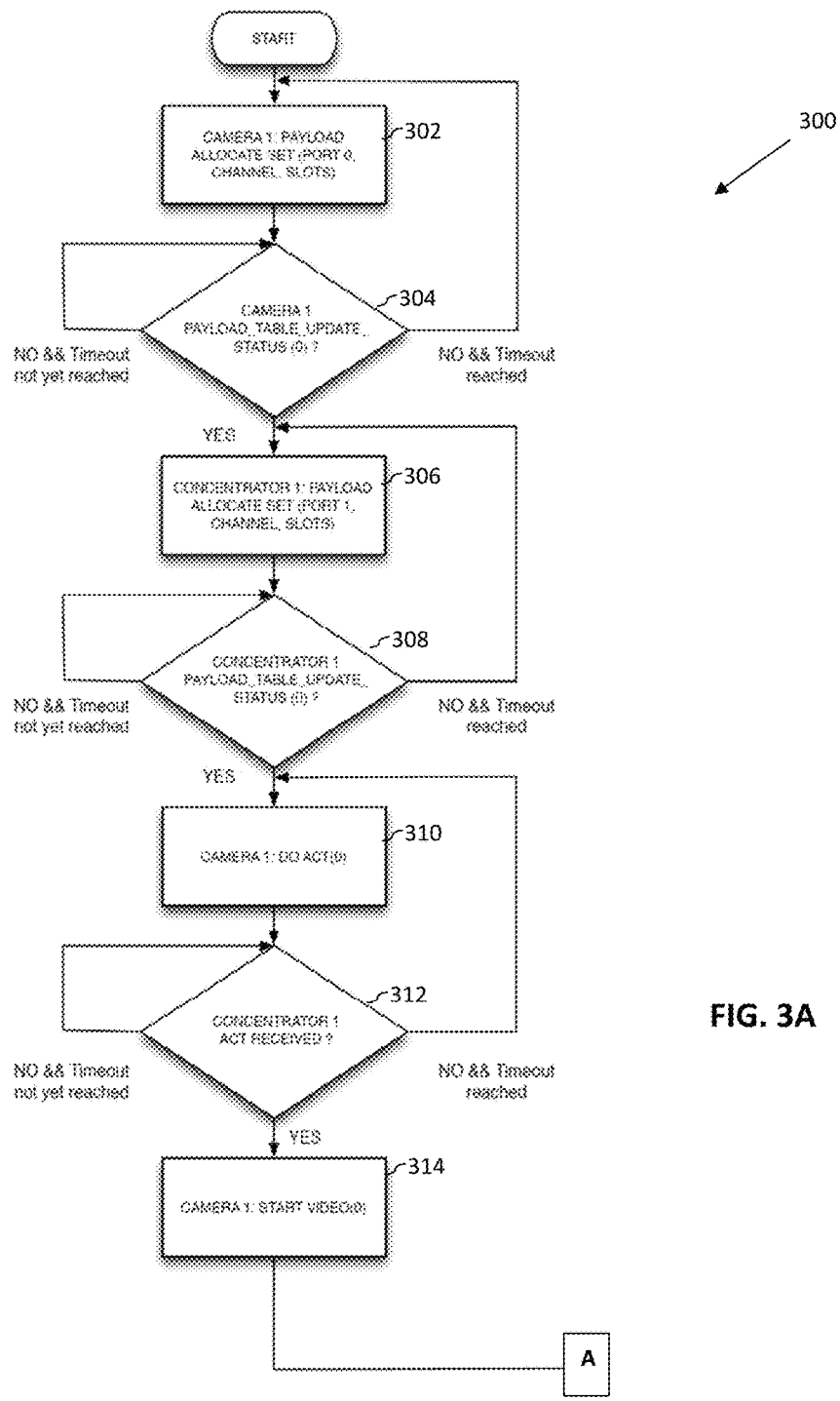
FIG. 3A is a logical flow diagram of one exemplary embodiment of a virtual channel allocation transaction as implemented within the exemplary network of FIG. 2.
Figure 3A:
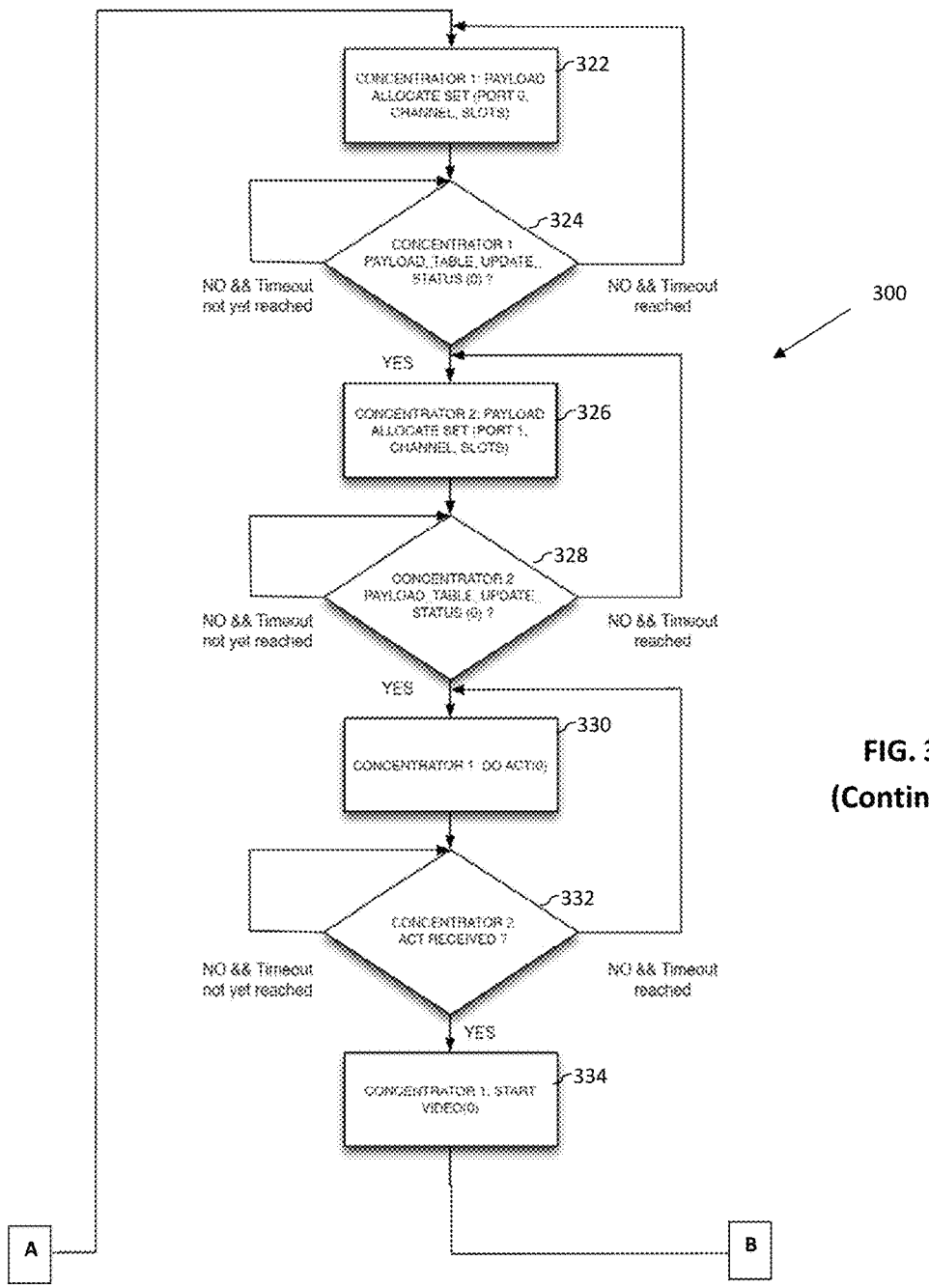
Figure 3A:
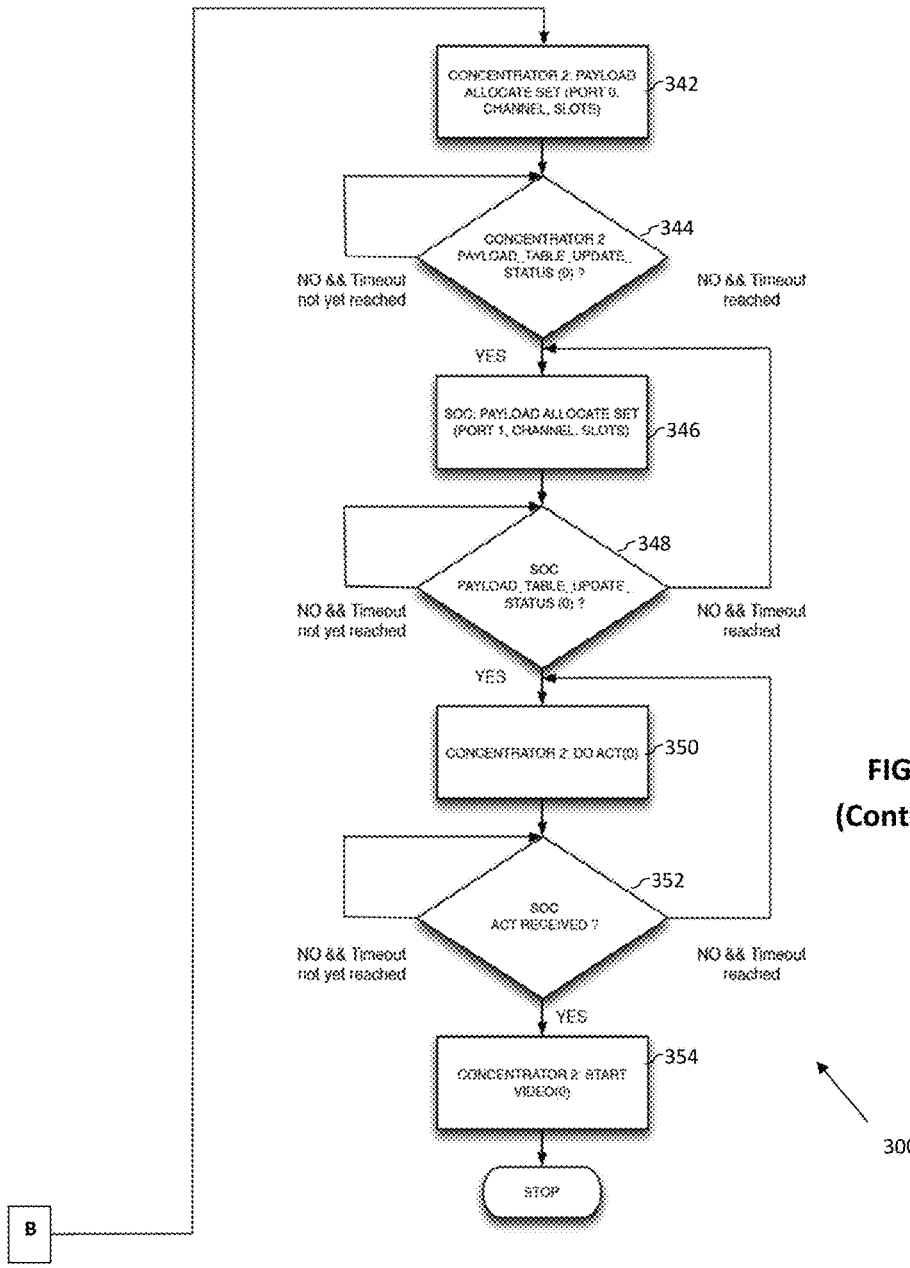
Figure 3B:
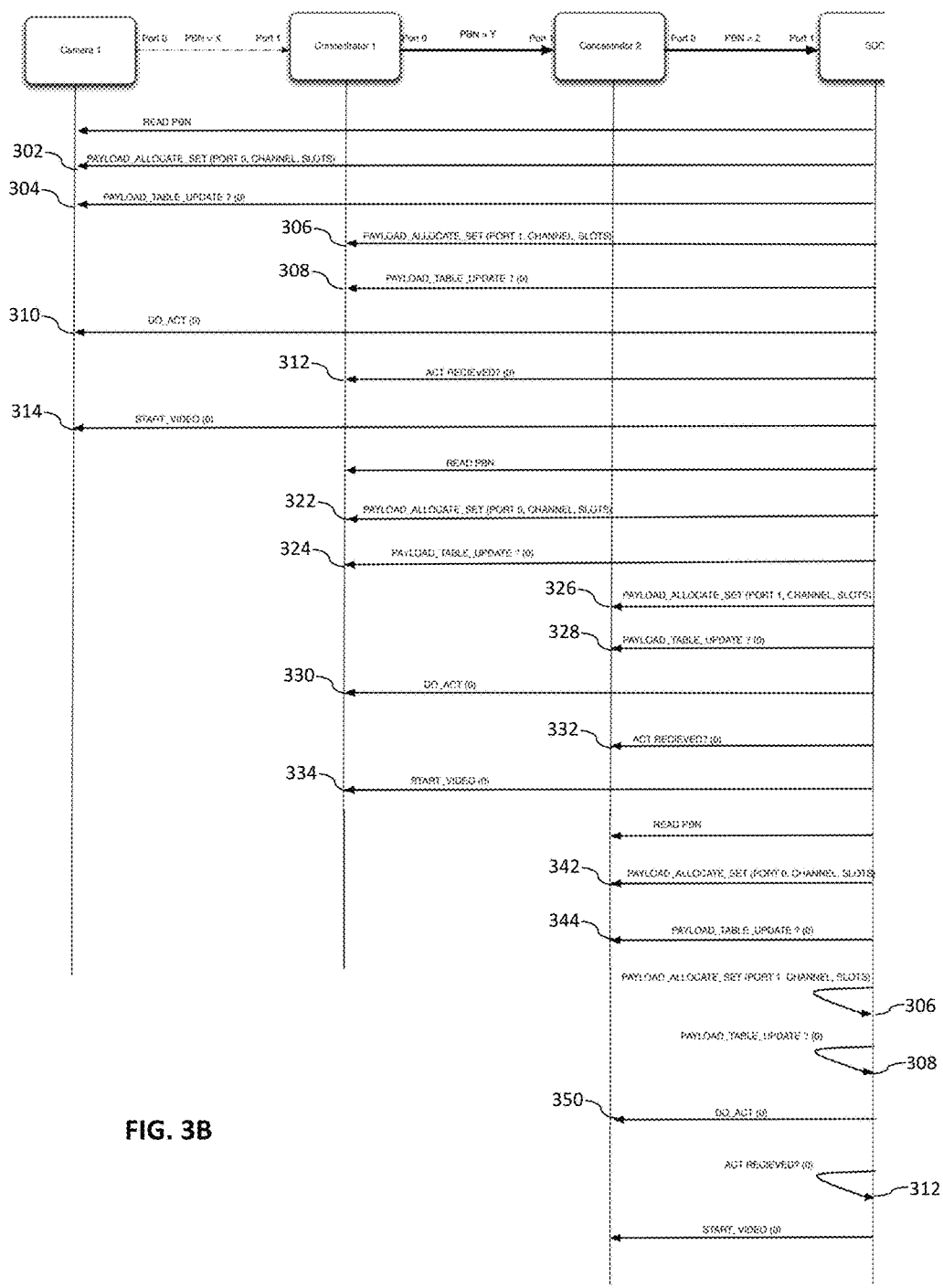
FIG. 3B is a timing diagram of the exemplary virtual channel allocation transaction as implemented within the exemplary network of FIG. 2.

FIG. 3A is a flow diagram of one exemplary implementation of a virtual channel allocation transaction 300 (i.e., as implemented within the exemplary system of FIG. 2). As shown, the exemplary transaction illustrates steps for bringing the first camera sensor 204A (Camera 1) online for video capture. FIG. 3B is a timing diagram of the exemplary virtual channel allocation transaction 300 of FIG. 2.

Prior to starting a stream transfer from the sources (the camera sensors 204A, 204B, 204C) to the sink 202, the sink 202 establishes virtual channel connections between the sources 204A, 204B, 204C and the sink 202. Each source and concentrator node includes an internal data structure that is configured to store local information regarding the node's appropriate virtual channel assignment. In one exemplary embodiment, the data structure is a Payload Bandwidth Manager table.

The exemplary Payload Bandwidth Manager table is a data structure that associates a stream with one or more time slots of an MTP packet. For example, a Payload Bandwidth Manager may identify that timeslots 1-4 are associated with virtual channel 1, and timeslots 5-8 are associated with virtual channel 2, etc. The timeslots may be contiguously or non-contiguously assigned.

In an embodiment, two types of symbol sequences are mapped to the virtual channel (VC) payload time slots: (i) stream symbol sequences generated by a source device and (ii) VC payload fill (VCPF) symbol sequences generated by a concentrator. A stream symbol sequence generator is present in a source (e.g., a camera) to provide data symbols. In a variant, the stream symbol sequence is present only in a source (i.e., concentrators are not also stream symbol sequence generators). A concentrator generates VCPF symbol sequences where there are no data symbols. In other words, the concentrator forwards the stream symbol sequences received from the upstream device, and when there are no stream symbol sequences to forward, the concentrator transmits the VCPF symbol sequence it generates (e.g., null data). In some variants, both symbol sequences may consist of a unit of four symbols, regardless of lane count.

Upon establishing a new VC payload, a concentrator (e.g., an uPacket TX) sends VCPF Symbol Sequence as the default symbol sequence for a number of packets (e.g., at least 16 MTPs) before starting the transmission of stream symbol sequences. When there is no stream symbol sequence to insert, the concentrator continues transmitting VCPF symbol sequence. The ability to stuff VCPF Symbol Sequences is useful due to the fact that the concentrator could have multiple incoming streams that have an absolute frequency that are different from each other. The output from the concentrator can be synchronous to any of the multiple streams or an average frequency of the multiple independent streams. In either case there is the opportunity of the concentrator having to account for overflow or underflow situations.

In another embodiment, each receive and transmit port has a corresponding VC Payload ID table. The receive port table matches the contents of a timeslot to a particular stream, the transmit port table identifies which timeslot on which the particular stream may be transmitted. In the illustrated paradigm, a source may only have a transmit table, a sink may only have a receive table, and a concentrator may have both. In some variants, the stream identification is consistent across all nodes (e.g., virtual channel 1 is uniquely identified, virtual channel 2 is uniquely identified, etc.). In other embodiments, the stream identification may not be unique (and may be managed on a node to node basis).

Referring now to step 302 of the method 300, the first camera sensor 204A is powered on, and responsively is instructed to update its payload allocation table for its downstream port (port 0). Depending on the resolution of the video that the first camera sensor 204A is capable of transmitting, the first camera sensor 204A calculates a payload bandwidth number (PBN) or similar metric.

The exemplary PBN represents the number of timeslots which are necessary to support the one or more payload streams. The payload stream content may comprise any number of content, including but not limited to: audio data, video data, and/or metadata such as time date information, gyroscopic information, compass information, location information, etc. One exemplary data format is described in commonly owned, and co-pending U.S. patent application Ser. No. 14/566,554, entitled "APPARATUS AND METHODS FOR PACKING AND TRANSPORTING RAW DATA", filed Dec. 10, 2014, incorporated herein by reference in its entirety.

At step 304, the first camera sensor 204A sets the virtual channel (VC) PBN of its own downstream link by allocating sufficient time slots to the VC payload. The allocation is not active until the payload bandwidth manager (an application executed from the sink 202) synchronizes the time slot allocation change across the multiple links of the path (described in greater detail in subsequent steps).

The payload bandwidth manager sink 202 polls the first camera sensor 204A for completion; when the payload table update is complete, the payload bandwidth manager sink 202 proceeds to step 306. As shown, the payload bandwidth manager sink 202 may additionally monitor a timer to retry the update in the event that the update instruction fails. In some embodiments, a failure (or several failures after a number of retry attempts) will trigger an error condition which aborts the process.

At step 306, the payload bandwidth manager sink 202 instructs the next node to update in accordance with the changes; in the exemplary scenario, the first concentrator 206A updates its upstream port (port 1) to match the first camera sensor 204A allocations.

At step 308, the first concentrator 206A matches the VC PBN of its upstream link corresponding to the first camera sensor 204A by assigning appropriate time slots to the upstream link. The payload bandwidth manager sink 202 polls the concentrator 206A for completion; when the payload table update is complete, the payload bandwidth manager sink 202 proceeds to step 310.

At step 310, the payload bandwidth manager sink 202 instructs the first camera sensor 204A to send a signal or message, such as an allocation change trigger (ACT). The ACT is sent in the main link by inserting a predefined ACT trigger sequence in four consecutive MST header time slots.

At step 312, when the first concentrator 206A receives the ACT trigger sequence, responsively the first concentrator 206A sends an interrupt to the payload bandwidth manager sink 202 indicating success.

Thereafter, at step 314, the payload bandwidth manager sink 202 instructs the first camera sensor 204A to start its transmission stream (e.g., video data, etc.).

The change is "rippled" through the network using the same procedure for each "hop" (i.e., link between connecting nodes). It is additionally noted that in the illustrated embodiment, the new stream generated by the first camera sensor 204A is processed by the first concentrator 206A, but is ignored ("dropped") by the second concentrator 206B until the second concentrator 206B is updated to support the new stream.

Briefly, at step 322, the first concentrator 206A is instructed to update its payload allocation table for its downstream port (port 0). As shown, the first concentrator 206A receives multiple streams (from the first camera sensor 204A and the second camera sensor 204B). Depending on the total bandwidth necessary to support the streams, the first concentrator 206A calculates a PBN.

At step 324, the first concentrator 206A sets the VC PBN of its own downstream link by allocating sufficient time slots to the VC payload. The payload bandwidth manager sink 202 polls the first concentrator 206A for completion; when the payload table update is complete, the payload bandwidth manager sink 202 proceeds to step 326.

At step 326, the payload bandwidth manager sink 202 instructs the second concentrator 206B to match the first concentrator 206A allocations.

At step 328, the second concentrator 206B matches the VC PBN of its upstream link corresponding to the first concentrator 206A by assigning appropriate time slots to the upstream link. The payload bandwidth manager sink 202 polls the concentrator 206B for completion; when the payload table update is complete, the payload bandwidth manager sink 202 proceeds to step 330.

At step 330, the payload bandwidth manager sink 202 instructs the first concentrator 206A to send an ACT. At step 332, when the second concentrator 206B receives the ACT trigger sequence it sends an interrupt to the payload bandwidth manager sink 202 indicating success.

At step 334, the payload bandwidth manager sink 202 instructs the first concentrator 206A to start its streams.

Similarly, at step 342, the second concentrator 206B is instructed to update its payload allocation table for its downstream port (port 0). The second concentrator 206B calculates a PBN for the combined bandwidth of all of the streams (incorporating the first camera sensor 204A, second camera sensor 204B, and third camera sensor 204C).

At step 344, the second concentrator 206B sets the virtual channel (VC) PBN of its own downstream link. The payload bandwidth manager sink 202 polls the second concentrator 206B for completion; when the payload table update is complete, the payload bandwidth manager sink 202 proceeds to step 346.

At step 346, the payload bandwidth manager sink 202 instructs its corresponding receiver to match the second concentrator 206B allocations.

At step 348, the payload bandwidth manager sink 202 receiver matches the VC PBN in its payload table, thereafter the payload bandwidth manager sink 202 proceeds to step 350.

At step 350, the payload bandwidth manager sink 202 instructs the second concentrator 206B to send an allocation change trigger (ACT). At step 352, when the ACT trigger sequence is received by the payload bandwidth manager sink 202 the chain has been fully configured.

At step 354, the payload bandwidth manager sink 202 instructs the second concentrator 206B to start its streams, completing the procedure 300.

Exemplary Apparatus

Various exemplary embodiments of component architectures are now described in greater detail. As described herein, the main video streams from components are based on the exemplary DisplayPort Multiple Stream Transport (MST) as outlined in the DisplayPort specification, Version 1.2 (published by the Video Electronics Standards Association (VESA) on Dec. 22, 2009), incorporated herein by reference in its entirety, although the present disclosure is in no way limited thereto.

However, unlike existing DisplayPort implementations which are managed by a source component, various of the disclosed embodiments described herein are managed by a sink component (or components).

Moreover, in some further simplified embodiments, the DisplayPort interface may replace the Auxiliary (AUX) channel, with an I2C type interface configured to set up and trigger dynamic bandwidth allocation changes. Traditionally, DisplayPort AUX channel is typically configured to set up MST operation, and incorporates procedures for topology discovery, bandwidth allocation with DisplayPort Configuration Data (DPCD) register access, etc. Accordingly, in variants that do not include an AUX channel, topology discovery may be skipped or handled in device software or firmware (e.g., the topology is preprogrammed as part of the system design).

Figure 4A:
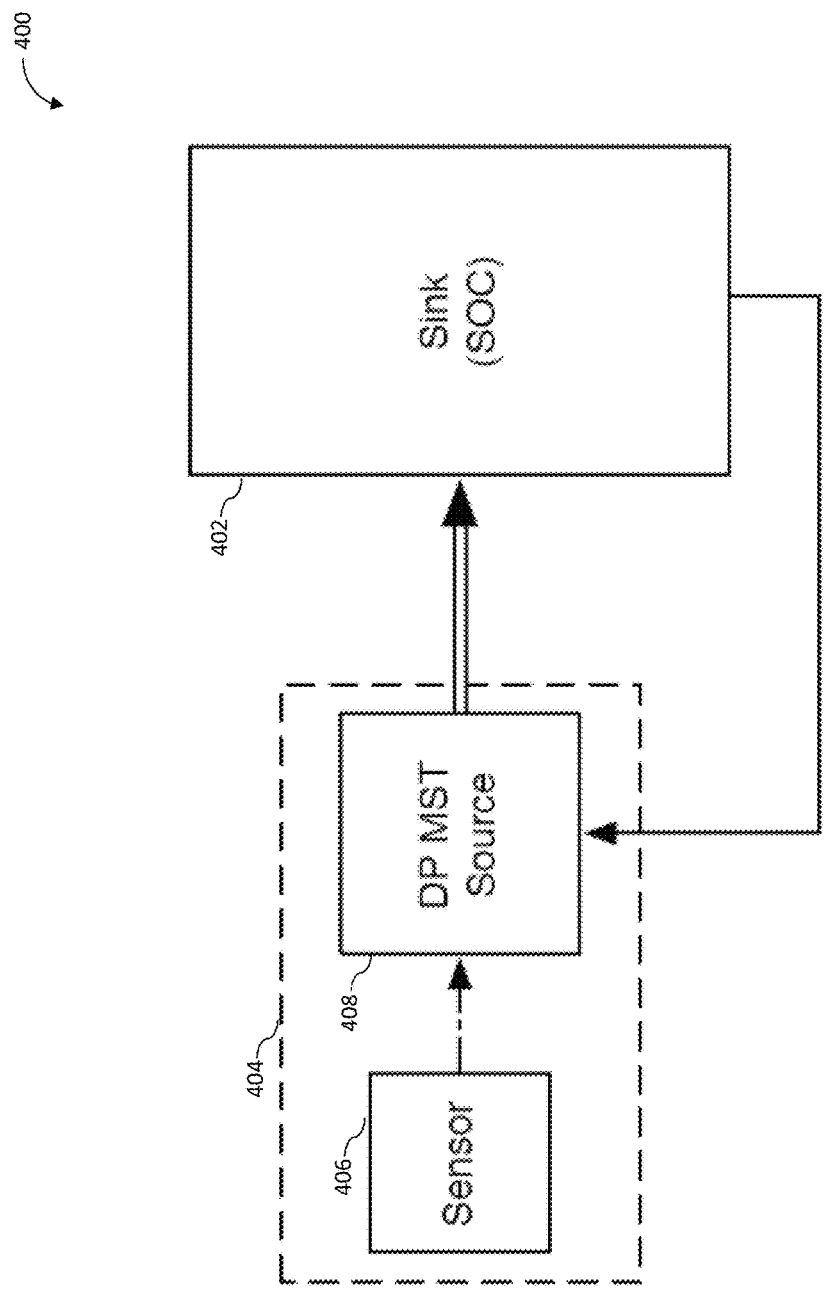
FIG. 4A is a logical block diagram of one exemplary embodiment of an A/V apparatus comprising a single sensor assembly outputting a single stream to a system on a chip (SoC), in accordance with the principles described herein.

Referring now to FIG. 4A, one exemplary embodiment of an A/V apparatus 400 is depicted. As shown, the A/V apparatus 400 comprises a single camera sensor assembly 404 outputting a single DisplayPort stream (e.g., a video stream and associated metadata transmitted in DisplayPort Secondary Packets) to the system on a chip (SoC) 402. The camera sensor assembly 404 is the source of the single DisplayPort stream; the SoC 402 is the sink of the single DisplayPort stream.

In one exemplary embodiment, the camera sensor assembly 404 includes the physical camera sensor 406 and a simplified DisplayPort MST source 408. The simplified DisplayPort MST source is configured to pack sensor data into the DisplayPort protocol MST packets as a single virtual channel. In one variant, the camera sensor assembly 404 is contained within a single component (within the same silicon chip); in other implementations the camera sensor assembly 404 may be formed from various discrete components. The interface between the physical camera sensor 406 and simplified DisplayPort MST source 408 is typically an internal implementation dependant interface. In some cases, the interface is proprietary.

Figure 4B:
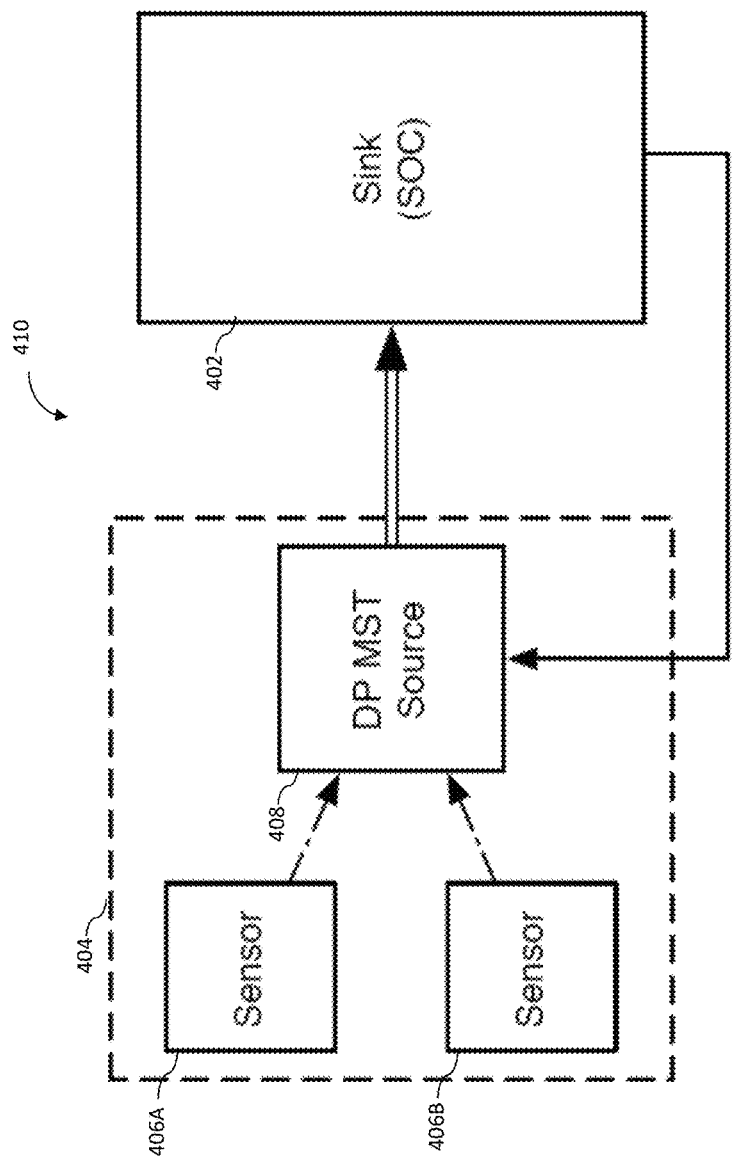
FIG. 4B is a logical block diagram of one exemplary embodiment of an A/V apparatus comprising a dual sensor assembly outputting two streams to a system on a chip (SoC), in accordance with the principles described herein.

Referring now to FIG. 4B, a second exemplary embodiment of an A/V apparatus 410 is depicted. As shown, the A/V apparatus 410 comprises one camera assembly 404 outputting two streams (e.g., a main picture virtual channel, and a thumbnail virtual channel) to the SoC 402. Here, the camera sensor assembly 404 includes two sensors 406A, 406B and a simplified DisplayPort MST source 408. The simplified DisplayPort MST source is configured to pack sensor data into the DisplayPort MST packets in two virtual channels (one for each sensor).

Figure 4C:
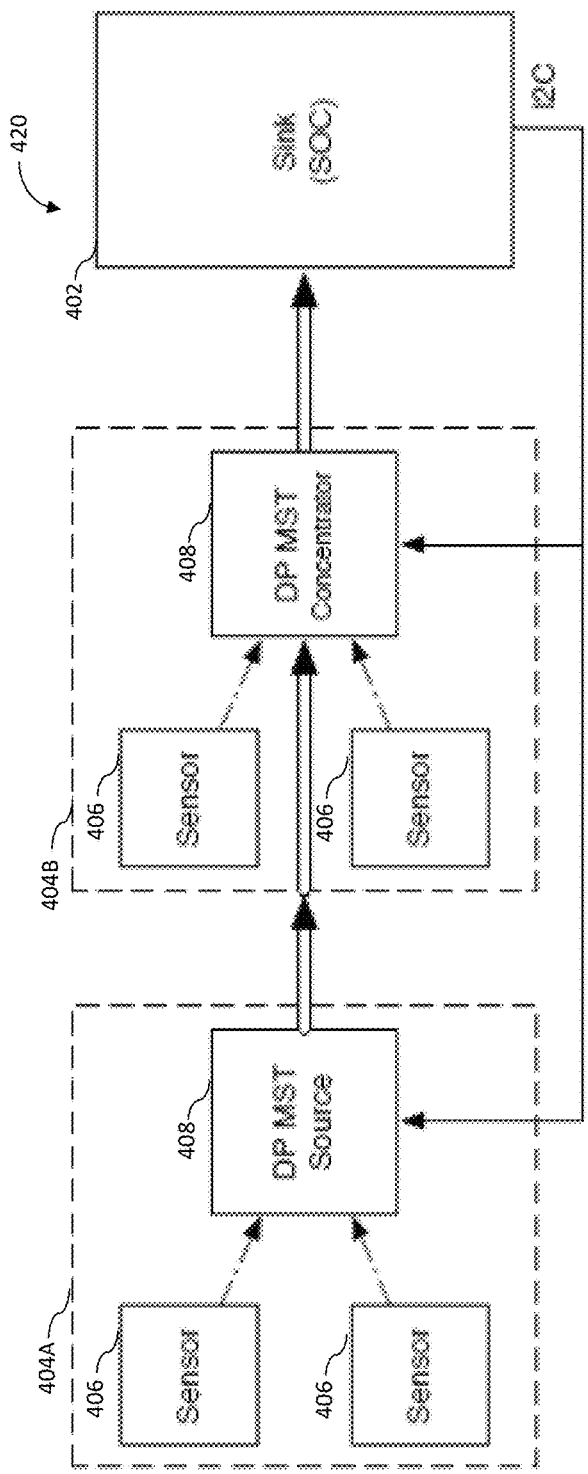
FIG. 4C is a logical block diagram of one exemplary A/V apparatus comprising two camera sensor assemblies in a daisy chained configuration, in accordance with the principles described herein.

FIG. 4C illustrates a third exemplary embodiment of A/V apparatus 420. As shown, the A/V apparatus 420 comprises two camera assemblies 404A, 404B which are daisy chained. The first camera assembly 404A outputs two streams to the second camera assembly 404B. The second camera assembly 404B receives the first camera assembly's 404A streams, unpacks the virtual channels, and forms a new MST packet comprising four virtual channel streams (the two streams of the first camera assembly 404A and the two streams of the second camera assembly 404B). The resulting stream is transmitted to the SoC 402.

As illustrated in FIG. 4C, the second camera assembly 404B functions as a multi-stream concentrator, and is configured to receive DisplayPort MST and transmit DisplayPort MST streams. Additionally, it is further noteworthy that the DisplayPort input does not have to match the bandwidth at the DisplayPort output. For example, the DisplayPort input may be running two lanes with High Bit Rate (HBR) at 8.64 Gbit/s operation, while the DisplayPort output may be running four lanes of HBR2 at 17.28 Gbit/s; this represents a fourfold difference in bandwidth.

Each node of the network can dynamically negotiate more or less bandwidth with the SoC 402 (although this may temporarily disrupt other streams while the network is updated). It is appreciated that fixed consumer devices (e.g., where the components not added or removed from the system), will not fine tune bandwidth requirements between components. However, dynamic adjustments can be used to further improve device operation by powering on or off unused sensors to e.g., save power when not in use. Moreover, it is appreciated that dynamic bandwidth adjustment also "future-proofs" devices, enabling hardware to continue to operate in scenarios which extend beyond those originally envisioned by the product designer.

Figure 4D:
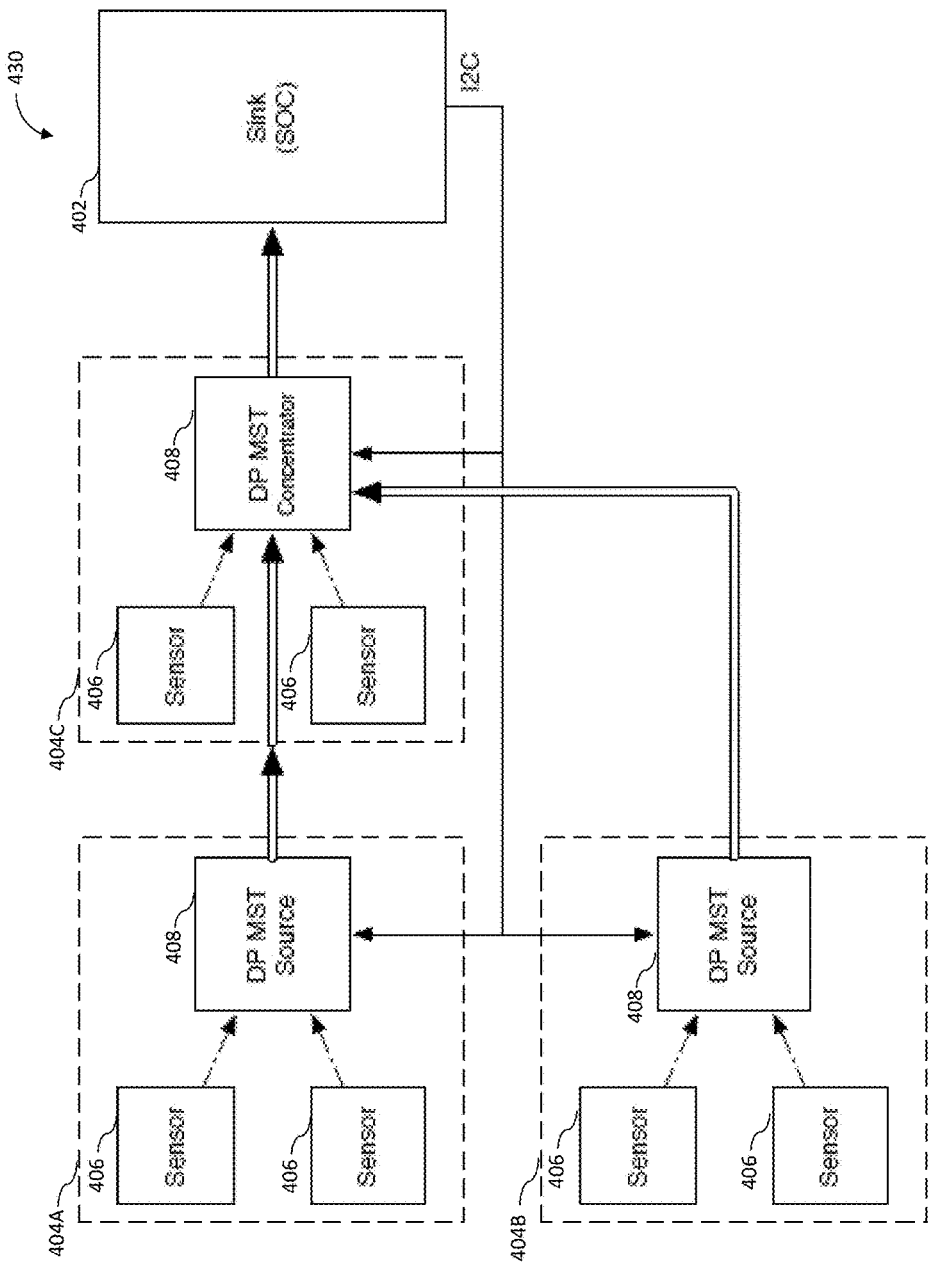
FIG. 4D is a logical block diagram of one exemplary A/V apparatus comprising multiple camera sensor assemblies in a cascaded configuration, in accordance with the principles described herein.

FIG. 4D illustrates a fourth exemplary embodiment of an A/V apparatus 430. As shown, the A/V apparatus 430 comprises a cascade of camera assemblies 404A, 404B, 404C. The first and second camera assemblies 404A and 404B each output two streams to the third camera assembly 404C. The third camera assembly 404C receives the streams, unpacks the virtual channels, and forms a new MST packet comprising six virtual channel streams (the two streams of the first camera assembly 404A, the second camera assembly 404B and the two streams of the third camera assembly 404C). The resulting stream is transmitted to the SoC 402.

While the foregoing FIGS. 4A-4D illustrate specific device configurations and layouts, it is recognized that various other implementations may be readily utilized by one of ordinary skill given the present disclosure, the apparatus of FIGS. 4A-4D being merely illustrative of the broader principles.

The various constituent node components of the apparatuses of FIGS. 4A-4D may include an upstream plurality of ports and corresponding receiving elements (e.g., receiving interfaces, transceiver interfaces), a downstream plurality of ports and corresponding transmitting elements (e.g., transmitting interfaces, transceiver interfaces), and one or more digital processing elements. Additionally, each node may include memory elements (e.g., storage devices), and/or audio and/or video elements. As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM.

It will be appreciated that not all elements are required in each node for operation within an apparatus. For instance, a source-only node would not require upstream ports, or certain audio or video elements. Conversely, a sink-only node may not require downstream ports.

Each source includes circuitry configured to pack data for transmission via one or more main lanes according to a transmitter mapping data structure e.g., a virtual channel (VC) payload table. The transmitter mapping data structure identifies for each stream of data, a corresponding resource for transmission. In one embodiment, each source node transmits data in a stream according to one or more corresponding timeslots identified by its virtual channel (VC) payload table. Each sink includes circuitry configured to unpack data received via one or more main lanes according to a receiver mapping data structure. The mapping data structure identifies which resources correspond to a stream of data. In one embodiment, each sink node unpacks timeslots into respective virtual channels according to a virtual channel (VC) payload table. In some embodiments, the same mapping data structure is used for both reception and transmission.

As used herein, the term "circuitry" refers without limitation to any type of component or device having any level of integration (including without limitation ULSI, VLSI, and LSI) and irrespective of process or base materials (including, without limitation Si, SiGe, CMOS and GaAs), as well as discrete components such as resistors, diodes, capacitors, inductive reactors, and any combinations of the foregoing.

In one exemplary embodiment, the network further includes a bi-directional I2C channel that carries information configured to negotiate changes to, and program, the virtual channel (VC) payload tables of each node. The main lanes are configured to transact packet-based unidirectional traffic, such as the DisplayPort protocol previously described herein. In some embodiments, a SoC sink 402 further controls the I2C bus. In other embodiments, programming is performed via an auxiliary (AUX) channel.

The SoC sink 402 processing subsystem is tightly coupled to operational memory, which may include for example SRAM, FLASH and SDRAM components. The processing subsystem may also comprise additional co-processors, such as a dedicated graphics accelerator, network processor (NP), or audio/video processor.

The SoC sink 402 is adapted to receive one or more media streams from the array of sensor assemblies 404 for processing for media displays such as a video display, or audio speakers. As used herein, the term "display" refers without limitation to any visual display device including e.g., LCD, plasma, TFT, CRT, LED, incandescent, fluorescent, and other types of indicator or image display technologies. SoC sink 402 may preferentially comprise graphics processors, applications processors, and or audio processors. In "thin clients" the SoC sink 402 may be significantly reduced in complexity and limited to simple logic.

The sensors 406 are adapted to provide one or more media streams to the simplified DisplayPort MST source 408 for transmission. In certain embodiments, the processing element 308 may receive one or more media streams from upstream data ports (e.g., as when operating as a branching or hub device).

It will be recognized that while certain embodiments of the present disclosure are described in terms of a specific sequence of steps of a method, these descriptions are only illustrative of the broader methods described herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein. While the above detailed description has shown, described, and pointed out novel features as applied to various embodiments, it will be understood that various omissions, substitutions, and changes in the form and details of the device or process illustrated may be made by those skilled in the art without departing from principles described herein. The foregoing description is of the best mode presently contemplated. This description is in no way meant to be limiting, but rather should be taken as illustrative of the general principles described herein. The scope of the disclosure should be determined with reference to the claims.

What is claimed is:

1. An apparatus configured to generate packets according to a virtual channel allocation, the apparatus comprising:
   a source device in data communication with a sensor;
   a non-transitory computer-readable medium comprising a storage apparatus having a plurality of instructions thereon, the plurality of instructions being configured to, when executed by a processor apparatus, cause the source device to:
   responsive to reception of a payload allocation table command from a sink device, update a payload allocation table;
   receive a data stream from the sensor, the data stream comprising raw sensor information captured by the sensor;
   pack the raw sensor information received from the sensor into a plurality of packets; and
   transmit the plurality of packets toward the sink device according to the updated payload allocation table.

2. The apparatus of claim 1, wherein the plurality of instructions are further configured to, when executed by the processor apparatus, cause the source device to pack the raw sensor information into a plurality of DisplayPort protocol packets.

3. The apparatus of claim 1, wherein the transmission of the plurality of packets comprises a transmission over a virtual channel corresponding to the sensor, the virtual channel being set based on a timeslot allocated for the plurality of packets.

4. The apparatus of claim 1, wherein:
   the source device is in data communication with a plurality of sensors; and
   the transmission comprises a transmission over a plurality of virtual channels each corresponding to a respective one of the plurality of sensors.

5. The apparatus of claim 1, wherein the sensor and the source device in data communication with the sensor are both contained within a single component.

6. The apparatus of claim 1, wherein the plurality of instructions are further configured to, when executed by the processor apparatus, cause the source device to transmit the plurality of packets to a second apparatus, the second apparatus comprising an intermediary device between the source device and the sink device.

7. The apparatus of claim 1, wherein the source device is in data communication with a second source device, the second source device being in data communication with a second sensor.

8. The apparatus of claim 1, wherein the sensor comprises a camera.

9. A method of virtual channel allocation, comprising:
   responsive to receiving data representative of a payload allocation table from a sink device, updating the payload allocation table;
   receiving a stream of sensor data from a sensor;
   implementing an audio-video protocol on the stream of sensor data received from the sensor, the implementing of the audio-video protocol comprising packing the stream of sensor data into a plurality of packets according to the audio-video protocol; and
   transmitting the plurality of packets toward the sink device in accordance with the payload allocation table.

10. The method of claim 9, further comprising:
    wherein the updating of the payload allocation table comprises updating a time slot allocation for one or more of the plurality of packets;
    determining a virtual channel based on the time slot allocation; and
    the transmitting of the plurality of packets comprises transmitting the one or more of the plurality of packets according to the determined virtual channel.

11. The method of claim 9, wherein the receiving of the stream of sensor data from the sensor further comprises receiving a plurality of streams of sensor data from a corresponding plurality of sensors.

12. The method of claim 11, wherein the implementing of the audio-video protocol further comprises packing each of the plurality of streams of sensor data into a respective virtual channel, each respective virtual channel corresponding to a respective time slot.

13. The method of claim 9, further comprising:
transmitting the plurality of packets to an intermediary device between the sensor and the sink device.

14. The method of claim 9, wherein the implementing of the audio-video protocol comprises implementing a protocol for use in a DisplayPort interface.

15. A non-transitory computer-readable medium comprising a storage apparatus having a plurality of instructions thereon, the plurality of instructions being configured to, when executed by a processor apparatus, cause a device to:
receive a first payload allocation table from a sink device;
send a second payload allocation table to a source device;
responsive to an allocation change trigger, activate at least one virtual channel based on the first payload allocation table and enable at least one other virtual channel associated with the source device based on the second payload allocation table;
receive a data stream from the source device, the data stream comprising sensor information captured by a sensor of the source device, according to the second payload allocation table; and
transmit the plurality of packets towards the sink device according to the first payload allocation table.

16. The non-transitory computer-readable medium of claim 15, wherein the device comprises a DisplayPort Multiple Stream Transport (MST) device.

17. The non-transitory computer-readable medium of claim 15, wherein the plurality of instructions are further configured to, when executed by the processor apparatus, cause the device to:
pack a second sensor information into a second plurality of packets of the at least one virtual channel; and
wherein the at least one virtual channel corresponds to one or more timeslots allocated for the second plurality of packets.

18. The non-transitory computer-readable medium of claim 15, wherein the device is in data communication with a concentrator device, the concentrator device being in data communication with a second sensor;
wherein the plurality of instructions are configured to, when executed by the processor apparatus, cause the device to:
output a first stream to the concentrator device; and
cause the concentrator device to output the first stream and a second stream to the sink device.

19. The non-transitory computer-readable medium of claim 18, wherein the device is in data communication with a second device, the second device being in data communication with a second sensor;
wherein the second device is configured to transmit a second plurality of packets to the concentrator device.

20. The non-transitory computer-readable medium of claim 15, wherein the sink device and the source device each comprise a system on a chip (SoC); and
wherein the source device, the device, and the sink device are all disposed within a single apparatus.

* * * * *